United States Patent [19]
Jenkins et al.

[11] 3,856,716
[45] Dec. 24, 1974

[54] HIGH DENSITY POLYURETHANE FOAMS

[75] Inventors: Victor Frederick Jenkins, St. Albans, England; Daniel Anthony Doherty, Dublin, Ireland

[73] Assignee: Laporte Industries Limited, London, England

[22] Filed: Aug. 1, 1973

[21] Appl. No.: 384,568

Related U.S. Application Data

[63] Continuation-in-part of Ser. No. 232,621, March 7, 1972, abandoned.

[30] Foreign Application Priority Data

Mar. 10, 1971 Great Britain.................. 6513/71

[52] U.S. Cl. 260/2.5 BD, 260/2.5 AN, 260/77.5 AN
[51] Int. Cl............................................ C08g 22/48
[58] Field of Search ........ 260/2.5 AN, 78.3, 2.5 BD

[56] References Cited
UNITED STATES PATENTS

| | | | |
|---|---|---|---|
| 2,962,455 | 11/1960 | Hostettler .................. | 260/78.3 R |
| 3,591,561 | 7/1971 | Kazama..................... | 260/2.5 AN |

OTHER PUBLICATIONS

Elastomer Chemicals Department Bulletin HR-32; du Pont; September 1958; p. 3 and 4.

Saunders et al., Polyurethanes: Chemistry and Technology, Vol. II, Interscience; N.Y.; 1964, pp. 49–51, 201–205.

*Primary Examiner*—Melvyn I. Marquis
*Assistant Examiner*—C. Warren
*Attorney, Agent, or Firm*—Larson, Taylor and Hinds

[57] ABSTRACT

Flexible high density polyurethane foam is produced by a quasi-prepolymerisation technique in which a "prepolymer composition" which is obtained from a diisocyanate and a copolymer of an ε-caprolactone, an epoxide and a monomeric diol chain initiator; is reacted with a "reactant mixture" which is a mixture of the copolymer and monomeric diol. The prepolymer composition and reactant mixture are stable, easily handled liquids which intermix easily and react quickly with each other, the presence of the diol in the reactant mixture facilitating mixing with the prepolymer composition to ensure good foam formation.

4 Claims, No Drawings

HIGH DENSITY POLYURETHANE FOAMS

CROSS REFERENCE TO RELATED APPLICATION

This application is a continuation-in-part of our earlier U.S. application Ser. No. 232,621 filed Mar. 7, 1972, now abandoned, and is related to copending U.S. application Ser. No. 224,332, filed Feb. 7, 1972, now U.S. Pat. No. 3,795,701.

BACKGROUND OF THE INVENTION

The present invention relates to the manufacture of polyurethanes which are usually the products of a reaction between a polyisocyanate and a compound or compounds having at least two active hydrogen atoms. More specifically but not exclusively the invention is concerned with the preparation of flexible "high density" polyurethane foams, "high density" being defined as a density greater than 0.3gm/cc, in which a cross-linking agent and a blowing agent are needed in the above mentioned reaction.

Hitherto the compound containing active hydrogen atoms has been a polyester or a polyether though the former have generally been preferred because they impart better physical properties such as tear strength and tensile strength to the foamed polymers. Unfortunately it has been found that the majority of the polyesters at present in use and all of the more economically useful ones such as polyethylene adipate and polycaprolactone are solids at ambient temperatures. This fact creates considerable difficulties in the plant, and in transportation since it is highly desirable to avoid storing reactive materials at elevated temperature, or to have to melt the materials before they can be transferred from their containers.

A further difficulty in the manufacture of foams arises from the relative reactivities of the precursors of the foam and the foaming agent. Unless the speed of the reaction and the mixing of the ingredients are properly controlled, poor foams can result. This is particularly the case in the so-called "quasi-prepolymerisation" technique for manufacturing polyurethanes.

SUMMARY OF THE INVENTION

We have found that these problems can be overcome by a quasi prepolymerisation technique which comprises the steps of:

a. taking a liquid copolymer, of MW between 700 and 4,000, of an $\epsilon$-caprolactone and an epoxide selected from the group consisting of ethylene oxide, propylene oxide and epichlorohydrin;

b. reacting said copolymer with a diisocyanate compound whereby a stable, isocyanate-terminated prepolymer is formed.

c. dissolving a monomeric diol in one or more liquid copolymers of MW between 700 and 4,000 of an $\epsilon$-caprolactone and an epoxide selected from the group consisting of ethylene oxide, propylene oxide and epichlorohydrin to form a liquid reactant mixture which is also stable and readily mixable with said liquid prepolymer.

d. dissolving a blowing agent in at least one of said prepolymer and said reactant mixture; and e. mixing together said reactant mixture and said prepolymer to cause them to react and the blowing agent to generate a blowing gas whereby a flexible foam of density greater than 0.3 gm/cc is formed.

Although quasi-prepolymer techniques are known in themselves particularly for the manufacture of rigid polyurethane foams and coatings (see for example U.S. Pat. No. 2962 455 of Hostettler and "Polyurethanes: Chemistry & Technology" V or II, Saunders et al.), hitherto it has not been appreciated that such techniques can successfully be adapted to the manufacture of flexible high density foams by including a monomeric diol in the reactant mixture, the prepolymer mixture being free from such diol. The effect of the presence of this diol in the reactant mixture is two fold. First, the viscosity of the reactant mixture can be matched to that of the precursor so that the reactant mixture is both liquid at room temperature and readily miscible with the precursor and secondly, this difunctional cross-linking agent produces the sufficient cross-linking in the final foam to render the foam both flexible and dense.

DETAILED DESCRIPTION

The copolymers used as starting materials in the present invention preferably comprise substantially alternating epoxide and lactone units, but it will be understood that in these preferred copolymers when the epoxide to lactone molar ratio is not 1:1 there will inevitably be present small blocks of epoxide and/or of lactone units. The number of epoxide or lactone units in such blocks will generally be a small integer for example 2, 3 or 4 and the copolymer will not be a block polymer in the generally accepted sense of that term. The preferred copolymers may be prepared in accordance with methods disclosed in the co-pending application Ser. No. 224,332. These copolymers, particularly the random copolymers, are liquids at ambient temperature over a wide range of compositions, moreover we have found that they form liquid prepolymers with many polyisocyanate compounds. Additionally and to our advantage we have found that they form homogenous solutions with many commonly used low molecular weight diols. The polyurethane foams formed from these copolymers have the good physical properties that are normally associated with those produced from polyesters.

The method of preparation disclosed in the co-pending application Ser. No. 224,332 involves reacting a lactone and an epoxide with a chain initiator in the presence of a catalyst, the lactone and epoxide being added to the chain initiator at such rates that each of the lactone and the epoxide react with the chain initiator or the growing chain at a substantially constant rate during the total addition. The lactone and epoxide are normally added as a homogeneous solution.

In order to prepare the copolymers used in the present invention, the lactone is an epsilon-caprolactone, preferably unsubstituted. A methyl epsilon-caprolactone may be used if desired, or a mixture of isomeric methylepsilon-caprolactones, or a mixture of isomeric methylepsilon-caprolactone with epsilon-caprolactone. The epoxide is epichlorohydrin, propylene oxide or, preferably, ethylene oxide. Mixtures of these epoxides may be used if desired.

The chain initiator may be any one of a wide range of compounds, for example an alcohol, amine mercaptan phenol or carboxylic acid. Preferably the chain initiator contains not less than two such reactive hydrogen atoms and it may be a polyfunctional alcohol, amine, mercaptan, phenol, amino-alcohol, mercaptoalcohol, carboxylic acid, hydroxycarboxylic acid or aminocarboxylic acid. Thus the preferred chain initiators are of the formula R(ZH)$_a$ in which R is aliphatic, cycloaliphatic, aromatic or heterocyclic group, Z is —O—, —S—, —C(O)O—, —NH— or —NR'— where R' is an alkyl, aryl, aralkyl or cycloalkyl group, and a is an integer, the integer being preferably not less than 2.

The initiator advantageously has the formula

HA—(CR$_2^2$)$_m$—AH in which formula the groups HA—, which may be the same or different, are carboxyl groups or monoalkylamino groups or mercapto groups or hydroxyl groups and the group —(CR$_2^2$)$_m$— is a group containing a chain of from two to eight carbon atoms in which the groups R$^2$ may be any group selected from methyl, ethyl, n-propyl, iso-propyl, n-butyl, iso-butyl, s-butyl, t-butyl, allyl and 1-methylallyl groups, hydrogen, chlorine and bromine atoms or may be groups of the formula

—Y—R$^3$ or

—Z'—Y—R$^3$ in which formula —Y— is an ether linkage or an ester linkage which may be an oxycarbonyl group or a carbonyloxy group, —Z'— is a methylene, ethylene, propylene, trimethylene, tetramethylene, or methyl-substituted trimethylene group and —R$^3$ is a methyl, ethyl, n-propyl, iso-propyl, n-butyl, iso-butyl, s-butyl, t-butyl, allyl or 1-methyl-allyl group, provided that at least two of the groups R$^2$ are not hydrogen.

The most suitable initiators are those in which the two groups HA- in the above formula are hydroxyl groups, particularly those in which the groups R$^2$ of the carbon atoms adjacent to the groups HA are hydrogen atoms. Thus it is preferred to use, as initiators, glycols of the formula HO—CH$_2$—(CR$^2_2$)$_{m-2}$—CH$_2$—OH The group —(CR$^2_2$)$_{m-2}$— has from one to six carbon atoms in the chain and is substituted as provided for above, the substituents being preferably other than chlorine and bromine. Thus the lowest member of this series is 2,2-dimethylpropan-1,3-diol(neopentyl glycol). Other members of the series that are particularly suitable include 2,3-dimethylbutan-1,4-diol, 2,3,4-trimethylpentan-1,5-diol, 2,2-di(acetoxymethyl)-propan-1,3-diol (the diacetate of pentaerythritol) and the 2,2,4- and 2,4,4-trimethylhexan-1,6-diols.

The use of branched-chain glycols helps to produce a lower melting-point copolymer.

Other very suitable initiators include 1,2-dimethylethane-1,2-diol, 1,2,2-trimethylpropane-1,3-diol, 1-isopropyl-2-methylpropane-1,3-diol, 2,2-dimethyl-5-amino-1-pentanol, 2,2-dimethylsuccinic acid, 3,4-dichloroadipic acid, 2,3-dichlorosuccinc acid, 2,3-dibromosuccinic 2,3-dimethylsuccinic acid, 1,2-di(n-propyl)ethan-1,2-diol, 1,2-diethylethan-1,2-diol, the tetra-allyl ether of sorbitol, 2,5-dimethyladipic acid, 2,-2,3-trimethylbutan-1,4-diol, 2,3,4-trimethylpentan-1,5-diol and the mono-allyl ether of trimethylolpropane.

Other compounds which may be used as initiators include glycols of the formula

HO(CH$_2$)$_p$OH in which p is an integer from 2 to 10, for example ethylene glycol and hexane-1,6-diol, alkylene ether glycols of the formulae HO [(CH$_2$)$_q$O]$_p$ H and HO [—CH(CH$_3$)CH$_2$O]$_p$H in which q is an integer from 2 to 5 and p is an integer from 2 to 10; N-alkyldiethanolamines; cyclohexane diols and other cycloaliphatic diols; hydroquinone; aryl aliphatic diols such as hydroxymethyl phenyl propanols and phenylene diethanols; amino alcohols, for example, ethanolamine, diethanolamine, triethanolamine, triisopropanolamine, p-aminophenylethanol and aminocyclohexanols, diamines of the formula R$^4$NH(CH$_2$)$_p$NHR$^4$ in which p is an integer from 2 to 10 and R$^4$ is hydrogen or an alkyl, aryl, aralkyl or cycloalkyl group, for example ethylene diamine, hexamethylene diamine and N-methyl hexametylene diamine; aromatic diamines such as p-phenylenediamine, 4,4'-methylene-dianiline, 4,4'-diamino-diphenylmethane, and 2,7-fluorenediamine; cycloaliphatic diamines such as 4,4'-isopropyldiene bis cyclohexylamine; heterocyclic amines such as piperazine; polyols such as glycerol, trimethylolpropane, hexanetriol, pentaerythritol, sorbitol, alkyl glycosides, glucose, starch and cellulose, polyamines, for example triethylene tetramine and toluene-2,4,6-triamine; carboxylic acids, for example, adipic, phthalic, salicylic, 6-hydroxycuproic, aminobenzoic, citric and trimellitic acids. Water and hydrogen sulphide are suitable inorganic initiators.

The reaction to form the copolymer is carried out in the presence of a catalyst, for example a Lewis acid, the catalyst being preferably present with the chain initiator to which the mixture of lactone and epoxide is added. Preferred catalysts include boron trifluoride, particularly in the form of a complex with an organic compound such as diethyl ether, stannic chloride and aluminium chloride. Many other chlorides are also suitable, for example, those of berylliun, zinc, cadmium, zirconium, antimony, bismuth and iron.

It has also been found that it is sometimes advantageous to use, as catalyst, boron trifluoride in combination with a proton acid. The proton acid is preferably an organic acid, particularly a strong organic acid, for example p-toluene sulphonic acid.

The temperature of the reaction is advantageously in the range 20°-100°C and it is preferably maintained in the range 50°-75°C.

The molar ratio of the epoxide to the lactone, particularly of ethylene oxide to caprolactone is suitably from 0.2:1 to 4:1 and is preferably from 0.3:1 to 2:1.

Table 1 shows more precisely that some copolymers produced by the method disclosed in the co-pending application Ser. No. 224,332 have been found to have properties which make them particularly desirable in the present invention. In each case neopentyl glycol was used as initiator.

Table 1

| % Ethylene Oxide Ethylene Oxide-in the ε-Caprolactone copolymer | Average M.W. of the co-polymer | M.p. of the copolymer | M.p. of the Prepolymer of 1 mole of copolymer with 2 moles 44' | Solubility of Butane 1,4 diol (% by weight) |
| --- | --- | --- | --- | --- |

Table 1—Continued

| | | | diisocyanate diphenyl methane | |
|---|---|---|---|---|
| 20 | 1000 | −10°C | −5°C | 25% at 25°C |
| 40 | 1000 | −10°C | −25°C | 25–30% at 5°C |
| 20 | 2000 | 0°C | −5°C | 25% at 70°C |
| 50 | 2000 | −30°C | −25°C | 25–30% at 5°C |

The polyisocyanate used in step (b) is preferably a diisocyanate compound. One which is particularly useful is 44' diisocyanate diphenyl methane, but it is also possible to use other diisocyanates, such as tolylene diisocyanate, diisocyanate dicyclohexyl methane or hexamethylene diisocyanate.

In step (c) of our invention, as defined above, the monomeric diol preferably has a molecular weight of less than 140 and contains from two to six carbon atoms per molecule. $\alpha, \omega$ diols are preferred, such as ethane diol or preferably, butane 1,4 diol. The monomeric diol may contain an ether linkage as for example in diethylene glycol.

The choice of blowing agent may be made from a wide range of those used in the art but we have found that water or a low boiling point halogenated hydrocarbon such as trichlorfluoro methane are suitable. Water generates the blowing gas, carbon dioxide, through its reaction with isocyanate groups (which are therefore provided in excess) whereas the low boiling point halogenated hydrocarbons vapourise to produce blowing gas.

The reactions between the copolymer and polyisocyanate (step b) to form the prepolymer, and between the prepolymer and the reactant mixture (step e) are each preferably carried out at a temperature in the range of from 20°C to 140°C. The reaction between the prepolymer and reactant mixture is particularly preferably carried out at between 30°C and 80°C.

In one or more of the stages (c), (d) or (e) in our invention it is often advantageous to introduce one or more other substances such as surfactants, pigments or catalysts. Normally any of these substances used are either dissolved or suspended in the prepolymer or reactant mixture before the mixing stage. A surfactant which has proven effective is that known in the trade as Silicon L-520 (supplied by Union Carbide). Typically the pigment may be carbon black and from the range of catalysts known in the art we prefer 1,4 diazo bicyclo (222) octane and/or dibutyl tin dilaurate.

Our invention will now be illustrated by way of examples only in order that the invention may be more clearly understood.

In all the following examples there was used a copolymer of ε-caprolactone and ethylene oxide which had been obtained by the following method:

20.8g (0.2 moles) of neopentyl glycol was heated to 60°C with 0.5g of boron trifluoride diethyl etherate (47% BF$_3$) as catalyst. A mixture of 85.1g (1.93 moles) of ethylene oxide and 294.0g (2.57 moles) of ε-caprolactone was then added over a period of 8 hours. Throughout the addition, and for one hour thereafter, the mixture was maintained at 60°–70°C. The resulting copolymer was a light yellow viscous liquid having an hydroxyl number of 55.0 mg KOH/g, an average molecular weight of 1,990 and an oxide content of 2.13% by weight.

EXAMPLE 1

The copolymer (18.85 gm) was reacted with 44' diisocyanato. diphenyl methane (18.85 g) at 80°C for 1 hour. The prepolymer thus formed was cooled to an ambient temperature and trichloro fluoro methane (1.8 gm) added. A reactant mixture was made comprising the copolymer (22.8 gm), butane 1,4 diol (4.6 gm), Silicone L-520 (1.3 gm), carbon black (0.07 gm) and a catalyst mixture of 1,4 diazo bicyclo (222) octane (0.033 gm) and dibutyl tin dilaurate (0.1gm), and was added to the prepolymer and the components mixed by rapid stirring for 10 seconds. A closed mould of volume 57 ccs. was preheated to 50°C and charged with 37 gms of the mixture. After 6 minutes the product was removed yielding a flexible foam of density 0.65 g/cc.

EXAMPLE 2

The copolymer (19.15 g) was reacted with 4,4' diisocyanate diphenyl methane (19.15 g) at 80°C for 1 hour. The prepolymer formed was cooled to ambient temperature. A reactant mixture comprising copolymer (23.4 gm), butane 1,4 diol (4.26 gm), Silicon L-520 (1.3 gm), water (0.08 gm), carbon black (0.07 gm) and a catalyst mixture of 1,4 diazo bicylco (222) octane (0.033 gm) and dibutyl tin dilaurate (0.1 gm) was made and was added to the prepolymer and the components mixed by rapid stirring for 15 seconds. A closed mould of volume 57 ccs was preheated to 50°C and charged with 37 gm of the mixture. After 6 minutes the product was removed yielding a flexible foam of density 0.65 g/cc.

EXAMPLE 3

The copolymer (19.15 gm) was reacted with 4,4' diisocyanato diphenyl methane (19.15 gm) at 80°C for 1 hour. The prepolymer formed was cooled to ambient temperature. A reactant mixture was made comprising the copolymer (12.8 gm), an ε-caprolactone-ethylene oxide copolymer (11.2 gm), containing 40% ethylene oxide and hydroxyl value 112 mg KOH per gram, butane 1,4 diol (3.7 g), Silicon L-520 (1.3 g) water (0.08 g), carbon black (0.07g), and a catalyst mixture of 1,4 diazo bicyclo (222) octane (0.033 g) and dibutyl tin dilaurate (0.1 g) was made and was added to the prepolymer and the components mixed by rapid stirring for 15 seconds. A closed mould of volume 57 ccs was preheated to 50°C and charged with 37 g of the mixture. After 6 minutes the product was removed yielding a flexible foam of density 0.65 g/cc.

After allowing the products from Examples 1 to 3 to cure for a further 48 hours at room temperature the foams had the properties listed in Table 2.

Table 2

| From Example | % water Uptake (1) | Hardness Shore A | Tear Strength Kg/cm (Graves) | Tensile Strength Kg/cm² | Elongation at Break % | Cold Flex Temp. (2) |
| --- | --- | --- | --- | --- | --- | --- |
| 1 | 15 | 50 – 60 | 45 | 100 | 550 | −30°C |
| 2 | 10 | 50 – 60 | 45 | 110 | 550 | −30°C |
| 3 | 10 | 50 – 60 | 40 | 100 | 550 | −30°C |

(1) This value was determined by immersing the sample of foam in a 1% (by weight) aqueous solution of sodium lauryl sulphate for 1 hour under a pressure of 5 Torr, and subsequently measuring the water which was absorbed.
(2) This temperature was determined using a Clast and Berg apparatus as described in British standard Specification 2782 Part 1 1965.

EXAMPLE 4

The copolymer (19.15 g) was reacted with 4,4' diisocyanate diphenyl methane (18.85 g) at 80°C for 1 hour. The prepolymer formed was cooled to ambient temperature. A reactant mixture comprising copolymer (23.4 g), butane 1.4 diol (4.26 g), Silicone L–520 (1.3 g), water (0.08 g), carbon black (0.07 g) and a catalyst of 1,4 diazo bicyclo (222) octane (0.33 g) was made and heated to 50°C. At this temperature it was added to the prepolymer, which was also preheated to 50°C, and the components mixed by rapid stirring for 5 seconds. A closed mould of volume 57 ccs was preheated to 50°C and charged with 37 g of the mixture. After 2 minutes the product was removed yielding a flexible foam of density 0.65 g/cc.

EXAMPLE 5

This example illustrates the advantage of using a quasi prepolymer technique over a "one shot" and a "full prepolymer" technique.
a. Quasi prepolymer systems A "prepolymer mixture" was prepared by reacting 18.85 g of the copolymer with 81.85 g of diisocyanate diphenyl methane at 80°C and cooling to room temperature. 1.8 g of trichloro fluoromethane were added. The resultant mixture was a liquid which had a viscosity of 2,500 centipoise at 25°C.

A reactant mixture was prepared by mixing 22.8 gm copolymer, 4.6 gm butane 1,4 diol, 1.3 g silicone L520, 0.07 g carbon black, 0.033 g of 1,4 diazo bicylo (2,2,2) octane and 0.1 g of dibutyl tin dilaurate. This mixture had a viscosity of 1,300 centipoise at 25°C.

When the prepolymer mixture was added to the reaction mixture, as described in Example 1, the two liquids intermixed easily and reacted fully to yield a foam of unform cell distribution, having an overall density of 0.65 gm/cc.

In further tests, it was found that the viscosity of the prepolymer mixture could be decreased and the viscosity of the reactant mixture could be increased by incorporating more copolymer in the reactant mixture and decreasing the copolymer content of the prepolymer by a corresponding amount. The mixing of the two liquids became even more easy as their respective viscosities approached the same value.

b. Full prepolymer systems

Full prepolymer mixtures were prepared by mixing 41.65 g of copolymer, and 18.85 g of 4,4' diisocyanate diphenyl methane at 80°C and cooling to room temperature. The resulting mixtures were all very viscous liquids having a viscosity of about 25,000 centipose at 25°C.

Reactant mixtures containing 4.6 gm butane 1,4 diol, 1,3 gm silicone L520, 0.07 gm carbon black, 0.033 gm 1,45diazo bicyclo (2,2,2) octane, and 0.1 gm dibutyl tin dilaurate were prepared. The viscosities of these liquids were found to be 65 centipoise at 25°C.

In attemping to form foams from these components in the manner described in Example 1, it proved impossible to mix the two components before the onset of foaming in view of the wide differences in viscosities of the components and the large differences in their volumes. As a result the mixtures failed to cure fully into usable foams. The resulting products in each case contained areas of unreacted material and in general had a poor distribution of cells.

c. One shot systems

Resin mixtures were prepared by mixing 41.65 g of copolymer, 4.6 g butane 1,4 diol, 1,3 g of silicone L520, 0.033 g 1,4 diazo bicyclo (2,2,2) octane. 0.1 g dibutyl tin dilaurate and 0.07 g of carbon black. The resulting liquids had viscosities of 2,600 centipose at 25°C. These liquids were then mixed with 18.85 g of 4,4' diisocyanate diphenyl methane.

4,4' diisocyanate diphenyl methane is a solid of mp 38°C. At 40°C it is a low viscosity liquid (viscosity about 6 centpoise. In order to mix the isocyanate with the resins adequately, and to effect the foaming reaction it was necessary to heat the diisocyanate to at least 40°C before adding it to the resin mixture.

Although the two components could be mixed more easily than those (b) above, considerable effort had to be put into the mixing process in order to ensure a uniform mixing of the small quantity of diisocyanate with the large quantity of resin mixture. The resulting materials therefore had much less satisfactory cell distributions than the foam of Example 1, and in some cases contained unreacted material.

We claim:

1. A method of making a flexible high density polyurethane foam which comprises:
   a. taking a liquid polyfunctional copolymer, of MW between 700 and 4,000, of an ε-caprolactone and an epoxide selected from the group consisting of ethylene oxide, propylene oxide and epichlorohydrin;
   b. reacting said copolymer with a diisocyanate compound thereby to obtain a stable, liquid isocyanate-terminated prepolymer
   c. dissolving a diol of molecular weight below 140 copolymers of MW between 700 and 4,000 of an ε-caprolactone and an epoxide selected from the group consisting of ethylene oxide, propylene oxide and epichlorohydrin to form a liquid reactant mixture which is also stable and readily miscible, with said liquid prepolymer
   d. dissolving a blowing agent in at least one of said prepolymer and said reactant mixture; and e. mixing together said reactant mixture and said prepolymer to cause them to react and the blowing agent to generate a blowing gas thereby to form a flexible foam of density greater than 0.3 gm/cc.

2. A method as claimed in claim 1 in which at least one liquid copolymer of ε-caprolactone and ethylene oxide is present which contains between 10 and 70% by weight of ethylene oxide.

3. A method as claimed in claim 1 in which the diisocyanate is 4,4' diisocyanate diphenyl methane.

4. A method as claimed in claim 1 in which the low molecular weight diol is butane 1,4 diol.

* * * * *